Figure 1:
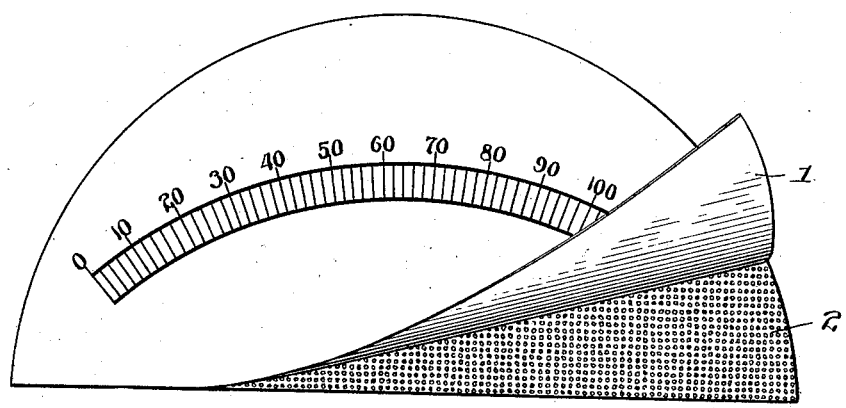

No. 746,600. PATENTED DEC. 8, 1903.
J. F. STEVENS.
DIAL PLATE.
APPLICATION FILED SEPT. 3, 1901.
NO MODEL.

WITNESSES:
Mae Hoffmann
Margaret Hoffmann

INVENTOR:
J. Franklin Stevens.
BY
Tivoli Crowsdale
ATTORNEY

No. 746,600. Patented December 8, 1903.

UNITED STATES PATENT OFFICE.

JOHN FRANKLIN STEVENS, OF PHILADELPHIA, PENNSYLVANIA.

DIAL-PLATE.

SPECIFICATION forming part of Letters Patent No. 746,600, dated December 8, 1903.

Application filed September 3, 1901. Serial No. 74,247. (No model.)

*To all whom it may concern:*

Be it known that I, JOHN FRANKLIN STEVENS, a citizen of the United States, residing at Philadelphia, in the county of Philadelphia and State of Pennsylvania, have invented a new and useful Dial-Plate, of which the following is a specification.

My invention relates to dial-plates; and the object of my invention is to provide an improved dial-plate which shall be inexpensive to make and which shall be durable and not liable to warp or be effected by moisture.

My dial-plate is particularly adapted for use in connection with electrical measuring instruments, but obviously may also be useful in other forms of meters or indicating devices in which the same qualities are desirable.

In all electrical measuring instruments it is necessary to provide a scale or dial-plate marked in definite electrical units in order that readings may be obtained. This scale is located so as to be readily visible and is traversed by a pointer or indicating-needle attached to the moving element of the measuring instrument, so that indications of the instrument are read by noting the position of the pointer relative to the scale-divisions marked on the scale or dial-plate. As a matter of commercial practice these scales or dial-plates are made in opal glass, porcelain, or cardboard and occasionally of metal. By far the greater number are made with cardboard dials, for the reason that cardboard is cheap, easily handled, and readily marked. In fact, in this country only two styles of dial-plates are in ordinary use in electrical measuring instruments, one consisting of opal glass for use in instruments in which it is essential that the dial should be illuminated by means of a light placed back of it, the other a cardboard dial, which is employed in a great majority of instruments and in all places where an opaque dial is not a disadvantage. Since cardboard is light and possesses a small amount of rigidity, it is necessary to mount the cardboard on a metal plate in order to give the scale or dial-plate absolute rigidity and to provide a means for securing the scale or dial-plate to the instrument-casing. In times past I have found difficulty in properly securing the cardboard scale to its supporting-plate, due principally to the fact that it is difficult to obtain a cement which will adhere firmly to an impervious metal and secure to this metal a piece of semi-impervious cardboard. There seems to be a tendency for the scale-card to loosen and fall off or else to warp, particularly when the instrument is subjected to any form of dampness. Such a warping of the cardboard interferes with the free action of the indicating-pointer on account of the small clearance between the pointer and the scale. I have discovered, however, a method of obviating this warping, which consists in perforating the metal plate to which the scale-card is secured, so that the cement employed has an opportunity to sink into the perforations, and thereby enables it to effect a closer union and contact with the metal.

Figure 2:
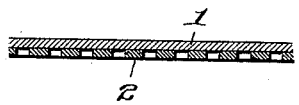

Referring to the drawings, Figure 1 is a view in perspective of my dial-plate with the cardboard partly separated from the metal plate to show surface of the latter. Fig. 2 is a cross-section of a portion of my dial-plate, on an enlarged scale.

Similar numerals refer to similar parts throughout the several views.

At present I am employing a metal plate 2 between twenty and twenty-five thousandths of an inch in thickness having about four hundred perforations per square inch, the perforations being approximately twenty-five one-thousandths of an inch in diameter. The plate 2 may be made of brass, copper, or tin, or of any other suitable material. Of course the thickness of the metal, together with the number of perforations per square inch, may vary considerably without materially affecting the results. The cementing material employed may be shellac or any other substance found suitable to unite the cardboard 1 with the metal 2. The cement should be a slow-drying cement, as it is frequently necessary to adjust the position of the scale-card upon its metal backing in order to make the pointer of the instrument fall within the space allotted to it within the cardboard. After this adjustment is obtained I have found it advantageous to dry the cement by the application of a moderate amount of heat while the card 1 and metal backing 2 are being subjected to pressure. Such a process forces a certain amount of the cementing material through the perforations of the metal plate and holds the two elements tightly together. In order to more thoroughly prevent the scale-card from swelling under moisture or blistering, I may coat it with some transparent substance which is impervious to water. This coating is applied after all the scale-divisions have been marked on the cardboard. I have found pure white lacquer to be very satisfactory for this coating; but any similar substance which is colorless and waterproof could be applied as well.

I have found scales or dial-plates constructed as indicated above to remain in perfect condition indefinitely and to completely overcome all tendency of the cardboard 1 to separate from its metal backing 2 or to warp or blister when subjected to moisture.

What I claim is—

1. As an article of manufacture, a dial-plate consisting of a flexible sheet marked with a scale, a metallic supporting-plate for same having perforations in its face to receive a cementing material, a cementing material to secure the flexible sheet to the metallic plate, and a waterproof transparent coating over said flexible sheet when so secured, substantially as described.

2. A non-warping dial-plate comprising a plate having numerous perforations, a flexible sheet bearing characters, said flexible sheet being secured to said perforated plate by cementing material applied to said sheet and engaging in said perforations.

3. A non-warping dial-plate comprising a supporting-plate having numerous perforations, and a flexible sheet bearing characters secured to said supporting-plate by cement applied to the back of said sheet and forced into said perforations.

4. A non-warping dial-plate comprising a non-absorbent plate having numerous perforations and a character-bearing sheet secured thereto by means of cement forced into said perforations.

5. A non-warping dial-plate comprising a non-absorbent plate having numerous perforations, and a semi-absorbent sheet bearing characters secured to said plate by cementing means forced into said perforations.

6. A dial-plate comprising a non-absorbent plate having numerous perforations, and a character-bearing sheet cemented to said plate, the cement being forced into said perforations.

7. A dial-plate comprising a supporting-plate having numerous perforations, and a scale-plate secured thereto by shellac forced into said perforations.

8. A dial-plate comprising a thin metal plate having numerous perforations, and a scale-plate of cardboard secured thereto by cement forced into said perforations.

9. A dial-plate comprising a metal plate having numerous perforations approximately uniformly distributed, and a scale-plate of cardboard secured thereto by cement.

10. A non-warping dial-plate comprising a scale-plate of warpable material, and a backing therefor consisting of a rigid plate having numerous perforations approximately uniformly distributed.

JOHN FRANKLIN STEVENS.

Witnesses:
JOHN THIEL,
MAE HOFFMANN.